Feb. 23, 1954   L. B. GLASER ET AL   2,670,198
ZERO AND TWO DIRECTIONAL FORCE MECHANISM
Filed Nov. 27, 1951
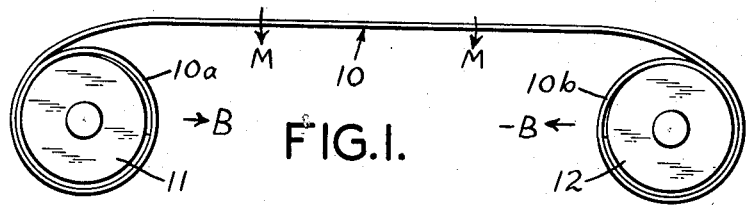
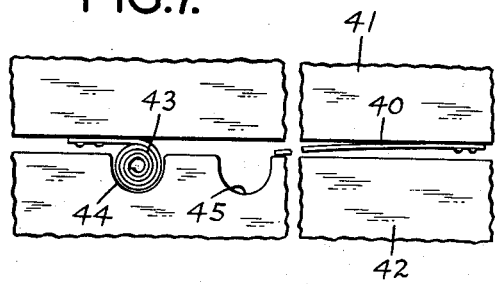
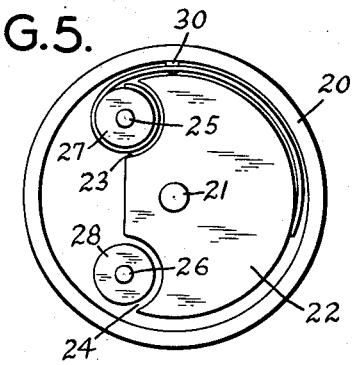
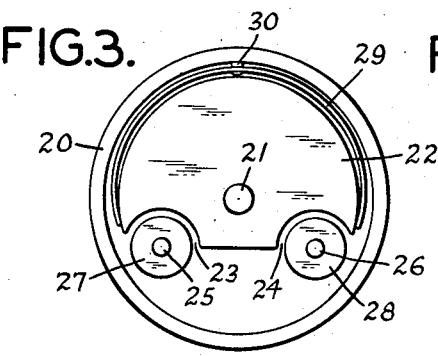
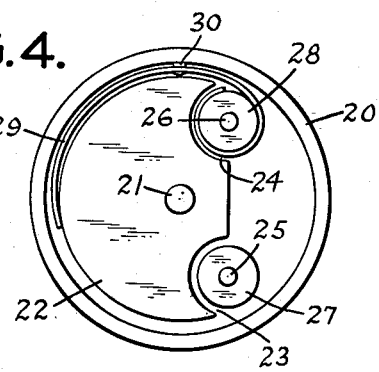
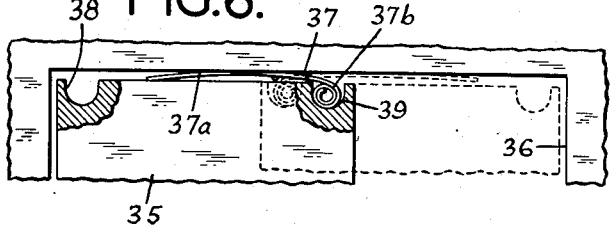
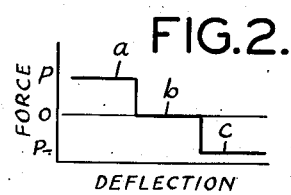
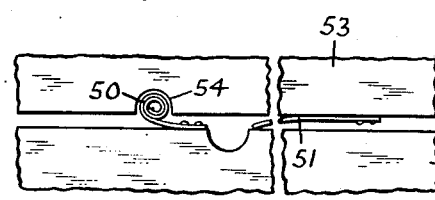
INVENTORS.
LEO B. GLASER
FRANK A. VOTTA, JR.
BY
Campbell, Brumbaugh, Free & Graves
THEIR ATTORNEYS.

Patented Feb. 23, 1954

2,670,198

UNITED STATES PATENT OFFICE 2,670,198

ZERO AND TWO DIRECTIONAL FORCE MECHANISM

Leo B. Glaser, Cranford, N. J., and Frank A. Votta, Jr., Ambler, Pa., assignors, by mesne assignments, to Eastern Metals Research Co., Inc., New York, N. Y., a corporation of New York Application November 27, 1951, Serial No. 258,454

14 Claims. (Cl. 267—1)

This invention relates to spring mechanisms or spring motors and it relates more particularly to a novel type of spring mechanism capable of exerting force in two opposite directions or changeable from a condition exerting zero force to conditions exerting force in either or both of two opposite directions.

Spring mechanisms or motors have been provided heretofore which are capable of exerting a force in two opposite directions. For example, spring actuated toggles have been provided heretofore in which a spring associated with a lever or linkage system has been able to exert force in either direction from a dead center position. Spring mechanisms of this type have several undesirable features. The first of these is that the dead center position of the spring mechanism is of extremely limited extent and in a properly designed mechanism of this type the dead center position is essentially negligible. Moreover, in mechanisms of this type, the energizing spring is stressed to the greatest extent and exerts its greatest force at the dead center position, this force falling off or decreasing as the mechanism approaches its limit of movement in either direction.

Other mechanisms such as loosely wound spiral springs can be wound up to exert a force up to a predetermined limit of movement on unwinding and can be unwound beyond this limit to exert a force in the opposite direction. However, here again, the zone of zero force in either direction is of extremely limited extent and, moreover, the amount of force available in either direction is to a large degree uncontrolled and unpredictable.

The present invention relates to a spring mechanism which is capable of exerting a controlled force in opposite directions and in which the zone of zero force can be regulated in accordance with requirements.

More particularly, the invention includes a pair of spring elements which may be separate or parts of the same spring, this spring being of a type in which the convolutions coil upon themselves normally to form a tightly rolled spiral. The spring elements are arranged so that they tend to coil up in opposite directions. Thus, if a single spring is used, it may be secured at about its mid-portion or any desired point along its length to the member so that the opposite ends of the spring form themselves into coils when released. These coils will naturally tend to coil up toward each other. The spring mechanism also includes another member which is positioned adjacent the member to which the spring or spring elements are affixed. The members are in such a close relation that there is insufficient space between them to permit the spring elements to coil up so that they are held in an essentially completely uncoiled position between these movable members. In this position with both ends or both elements of the spring uncoiled, the only force exerted by the spring is a substantially normal force to the fixed member and the movable member tending to urge them apart. That is, the spring exerts no force tending to move the members endwise or rotatably with respect to each other.

The member to which the spring or spring elements are not affixed is provided with recesses or other elements with which the ends of the springs engage. These elements afford sufficient clearance to allow the springs to coil therein or thereon. Thus, when the movable member is shifted so that one end of the uncoiled spring can engage the spring receiving means, that spring or element will coil up and will exert a force in the direction of coiling tending to displace the members relatively. The opposite end of the spring or the other spring element will not resist relative movements of the members other than by mere frictional engagement.

If the members are shifted in the opposite direction from a neutral or zero force position as described above, the other end of the spring or the spring element can engage another spring receiving element coiling up in it or on it thereby displacing the members relatively in the opposite direction.

By suitably spacing the spring receiving elements and the springs themselves it is possible to have an extended movement of the members relative to each other without the exertion of force thereon by either of the spring elements.

Devices of the type referred to above, may be used for many different purposes, for example in circuit breakers, double-throw switches, door opening and closing devices, in machines having reciprocating or oscillating control elements for changing direction and for many other purposes. The force exerted by the springs can, by suitable design of the spring, be made to increase as the elements approach their limits of relative movement, to decrease or to vary throughout the length of relative displacement, as may be required.

For a better understanding of the present invention, reference may be had to the accompanying drawings, in which:

Fig. 1 is a diagrammatic showing of a typical spring and supports for the ends thereof of a type used in the present invention;

Fig. 2 is a diagram illustrating the force effects of the spring of the type disclosed in Fig. 1;

Fig. 3 is a view in front elevation of a mechanism embodying the present invention shown in a position of zero or neutral force;

Fig. 4 is a view of the device disclosed in Fig. 3 illustrating the action of the device in moving to one of its limit positions;

Fig. 5 is a view of the device of Fig. 3 shown in the other limit position;

Fig. 6 is a view in elevation and partly broken away of a sliding door mechanism including the spring device embodying the present invention;

Fig. 7 is a view of a modified form of spring mounting embodying the present invention; and Fig. 8 is a view in section illustrating a further modification of the device embodying the present invention.

Referring to Figs. 1 and 2 of the drawings, there is illustrated a spring 10 formed of a ribbon of steel, "Duralumin," beryllium copper or the like, the spring 10 being formed throughout its entire length on the same radius of curvature to form essentially a constant or uniform tension spring of a type described and disclosed more particularly in the Lermont application Serial No. 95,956, filed May 28, 1949, which has issued as Patent No. 2,609,192, granted Sept. 2, 1952.

The spring 10, therefore, upon being freed of stress has a tendency to coil up into a tightly wound spiral. With this type of spring, it is possible to uncoil and recoil the end of the spring to form two opposed coils 10a and 10b. When these coil ends 10a and 10b are received on rotatable mandrels or rollers 11 and 12, the mandrels 11 and 12 are urged toward each other with equal force. However, the mid-portion of the spring 10 which has been straightened does not exert any inward force. Thus, when the spring 10 is completely extended, the only force is in the form of the movements M—M generally perpendicular to the spring which are developed as the material attempts to recoil to its natural radius. Since, in this condition, the strip is uniformly stressed throughout its length, there is no recoiling force in the direction B or —B.

If the left-hand end of the strip is allowed to recoil at its natural radius, a force P will be developed as shown in Fig. 1, in Fig. 2 at a. Conversely, if the right-hand end is allowed to recoil at its natural radius, an opposite force —P will be developed as shown in Fig. 2 at c. The resulting force deflection curve is shown in Fig. 2. A force P is developed at a. When the material is completely extended the force drops to zero as shown at b. At c, the spring develops a force —P as the right-hand end 10b coils upon the other roller or mandrel 12. The two opposite forces will be equal if the spring is stressed uniformly and the mandrel diameters are equal. By altering the diameters of the mandrels 11 and 12, different forces can be obtained. The two directional forces defined above can be obtained by fastening the spring 10 within its length or a similar effect can be obtained by using two separate spring elements with their outer ends secured in such relation that the springs tend to coil up in opposite directions. Different force effects can be obtained by the use of springs of different stress characteristics or by imparting curvatures of different radius or varying radii to the opposite ends of the same spring.

A typical apparatus making use of the force characteristics of the spring as described above, is illustrated in Figs. 3, 4 and 5 of the drawings. As shown in these figures, the mechanism may include a drum-like outer shell 20 having a centrally located shaft 21 secured thereto. Within the drum and supported rotatably on the shaft is a semi-circular member 22 which is throughout the major portion of its periphery concentric with the drum 20 and the shaft 21. The lower edge of the member 22 is cut away and is provided with arcuate recesses 23 and 24 in which are mounted small supporting shafts or pins 25 and 26. These pins support rotatably the rollers 27 and 28, respectively.

The spring 29 of the type referred to above is fixed at about its mid-portion to the interior surface of the drum 20 by means of a rivet or screw 30. The spacing between the outer periphery of the member 22 and the inner periphery of the drum 20 is slightly more than the thickness of the spring 29 so that when a member 22 and the drum 20 are in the position shown in Fig. 3, the opposite ends of the spring 29 are substantially completely uncoiled and received in the space between the members 20 and 22. In this position, the spring 30 does not exert any force tending to rotate the drum and the semi-circular member 22 relative to each other. However, if the member 22 is rotated in a counterclockwise direction until the right-hand end of the spring engages the roller or mandrel 28, the right-hand end of the spring will immediately coil up on the roller 28 and will rotate the member 22 in a counterclockwise direction as shown in Fig. 4. Similarly, if the member 22 is rotated from its neutral position, as shown in Fig. 3 in a clockwise direction, the left-hand end of the spring 29 will engage and coil up on the roller 27 thereby exerting a force rotating the member further in a clockwise direction to the position shown in Fig. 5. The extent of movement of the member 22 in its neutral position can be regulated by making the spring 29 longer or shorter. If the spring is shorter than the length illustrated in Fig. 3, a substantial rotary movement of the member 22 can be obtained before one end of the spring or the other engages its corresponding roller 27 or 28 and causes further rotation of the member 22. Similarly, an extended neutral rotation can be obtained by making the spring 29 longer so that when the member 22 is in neutral position both ends of the spring are coiled around their respective rollers 27 and 28. Thus, the actions of the coiled portions of the spring 29 are essentially equal and opposite and there is little resistance to movement of the member 22 until one end of the spring disengages from its corresponding roller whereupon the other end of the spring will tend to continue to coil up and will exert a rotational force or torque on the member 22. Different torque effects can be obtained by bending the ends of the spring 29 on opposite sides of the screw or rivet 30 on different radii of curvatures or by making the rollers 27 and 28 of different diameters.

As illustrated in Fig. 6, spring mechanisms of the type described can be used for opening and closing doors. Thus, as shown in Fig. 6, a door 35 may be mounted for transverse sliding in a suitable door frame 36 in any conventional way. Double doors are used in the embodiment disclosed because the opening 36 is substantially wider than the width of a single door. The invention is applicable, of course, to single doors which slide into and out of a recess in the wall.

A spring 37 of any of the types described above is secured to about the middle of the top of the door frame 36 between the door frame and the top edge of the door 35. The spacing between the top of the door and the frame is insufficient to permit the opposite ends of the spring 37 to coil up so that, as shown in Fig. 6, the left-hand end 37a of the spring is substantially completely straightened and bears against the upper edge of the door. The opposite upper corners of the door are provided with arcuate recesses 38 and 39 to receive the corresponding ends of the spring 37 for coiling movement. Thus, the spring portion 37a can engage in the recess 38 when the door is shifted to the right and can coil up therein to exert a force urging the door to the right. With the door in the position shown, the right-hand end 37b of the spring 37 is coiled up in the recess 39 thereby urging the door 35 to the left to a closed position. When the door 35 is moved to the right, it is moved against the coiling force of the spring end 37b thereby uncoiling this portion of the spring. When the end of the spring section 37a engages in the recess 38 it exerts an opposite force substantially equal to that of the spring section 37b thereby neutralizing the forces of the spring. This condition remains until the door is moved a sufficient distance to the right to disengage the spring section 37b from the recess 39. At that time, the force of the spring section 37a, which is unopposed, urges the door to the right to a fully opened position.

While the above-described embodiments of the invention utilize a single spring secured along its length to one of the members, similar results can be obtained by using separate spring elements secured with their outer ends adjacent or with their outer ends directed in opposite directions, as illustrated in Fig. 7. In this form of the invention, the spring element 40 is shown fully extended between an upper member 41 and a relatively movable lower member 42. The other spring element 43 is likewise secured to the member 41 and is shown coiled in a recess 44 in the upper edge of the lower member 42. With this arrangement of the spring elements 40 and 43 they normally tend to coil away from each other so that as the member 42 moves to the right relative to the member 41, the spring 43 is uncoiled exerting force to the left. This condition remains until the inner end of the spring 40 engages in the recess 45 in the upper edge of the member 42 whereupon the spring member 40 begins to coil in this recess and offsets the force exerted by the spring 43. Continued movement of the member 42 to the right will disengage the spring 43 from the recess 44 and the spring 40 will then exert its full force to move the member 42 to the right to its limit position.

The spring elements do not have to be mounted on the same member. As shown in Fig. 8, the spring elements 50 and 51 can be mounted on the opposed members 52 and 53, respectively, and cooperate with the recesses 54 and 55, respectively.

The force effects of the springs can be made large or small or they can be varied in any of the ways disclosed in the Lermont application Serial No. 95,956, to enable a controlled application of force to the relatively movable members. The springs may be of any desired length depending upon the movement desired and upon the desired extent of movement without the exertion of force on the relatively movable members by the springs. Many other changes may be made in the structure of the relatively moving members and spring mechanisms of the type may be built into machines and other devices to control the movement of relatively movable parts thereof. Therefore, the forms of the invention disclosed herein should be considered as illustrative and not as limiting the scope of the following claims.

We claim:

1. A two directional spring mechanism comprising a pair of relatively movable opposed members, oppositely coiling spring elements interposed between said members and maintained in at least partially uncoiled condition by engagement between said members, each of said spring elements being fixed at one end to one of said members and corresponding receiving means on the opposed member to receive said coils for coiling movement, said receiving means being positioned to receive one spring element and be disengaged from the other spring element when said one spring element is fully coiled.

2. A zero and two directional force mechanism comprising a pair of relatively movable members having adjacent portions, a normally coiled spring fixed at a point along its length to one of said members between said adjacent portions and normally tending to coil up on opposite sides of said point, said adjacent portions being spaced apart a distance insufficient to permit said spring to coil up between them, the other member having means thereon spaced a predetermined distance apart to receive said coils rotatably, the length of said spring and the distance between said receiving means being related so that when one of said coils is completely coiled at one of said receiving means, the other coil is disengaged from the other receiving means and is at least partially straightened and disposed between said adjacent portions.

3. A zero and two directional force mechanism comprising a pair of relatively movable members having adjacent portions, a normally coiled spring fixed at a point along its length to one of said members between said adjacent portions and normally tending to form coils on opposite sides of said point, said adjacent portions being spaced apart a distance insufficient to permit said spring to coil up between them, the other member having means thereon spaced apart a predetermined distance to receive said coils rotatably, the length of said spring being less than the distance between said spaced receiving means.

4. A two directional force mechanism comprising a pair of adjacent relatively movable members, a pair of spring elements interposed between said members and fixed to one of the members, said spring elements normally tending to coil up toward each other and being held in a substantially completely uncoiled condition between said members in one relative position of said movable members, and spaced apart means on the other member corresponding to each spring element to receive said elements for coiling, said receiving means being spaced apart along said other member to engage their corresponding spring elements selectively, said relative movement of said members in one direction causing one spring element to be straightened and disengaged from its corresponding receiving means, while the other spring element coils up at its corresponding receiving means.

5. A zero and two directional force member comprising a first member, a pair of normally coiled spring elements fixed to said member, said spring elements normally tending to coil up in opposite directions, a second member adjacent to said first member, said first and second members being relatively movable between opposite limit positions, said first and second members, in an intermediate position, being spaced apart a distance insufficient to permit the spring elements to coil up between the members to retain said spring elements in substantially a completely uncoiled condition, and spaced apart means on said second member corresponding to each spring element to receive one corresponding spring element for coiling and to disengage the other receiving means from the other corresponding spring element as said members are moved relatively from said intermediate position toward a limit position to enable the coiling force of said one corresponding spring element to move the members to the last-mentioned limit position.

6. The spring mechanism set forth in claim 1, comprising means supporting said members for relative rotation about a common axis.

7. The spring mechanism set forth in claim 1, comprising means supporting one of said members for movement substantially rectilinearly with respect to the other member.

8. The spring mechanism set forth in claim 1, in which the means to receive an adjacent spring element comprises a rotatable member about which the spring element can coil freely.

9. The spring mechanism set forth in claim 1, in which the means to receive an adjacent spring element comprises a recess providing sufficient clearance between said members to enable the spring element to coil therein.

10. A zero and two directional force mechanism comprising a pair of members having spaced apart, opposed substantially concentric arcuate surfaces and providing an arcuate space therebetween, means supporting said members for relative rotation about the center of curvature of said surfaces, a normally coiled spring fixed at a point along its length to one of said members and normally tending to coil up on opposite sides of said point, said spring being disposed between said arcuate surfaces and extending lengthwise of said arcuate space, the width of said space being insufficient to permit said spring to coil up therein, and means on the other member in angularly spaced relation providing clearance spaces between said members to receive opposite ends of said spring and permit said opposite ends to coil up therein selectively and rotate said members relatively.

11. The zero and two directional force mechanism set forth in claim 10, comprising rollers rotatably mounted on said other member in said clearance spaces, said opposite ends of said spring being engageable with corresponding rollers to coil thereon.

12. A spring mechanism comprising a pair of relatively movable members having adjacent portions, a normally coiled spring fixed at a point along its length to one of said members between said adjacent portions and normally tending to form at least one coil to one side of said point, the other member having means to receive said spring for coiling movement, said adjacent portions being spaced apart a distance greater than the thickness of the spring and insufficient to allow the spring to form a coil therebetween, said members being movable into a relative position in which said spring is disengaged from said spring-receiving means and is straightened and wholly disposed between said adjacent portions.

13. The spring mechanism set forth in claim 1 in which said members have adjacent, substantially straight edges, said edges being spaced apart a distance greater than the thickness of said spring elements, but less than the distance required for coiling of said spring elements therebetween.

14. The spring mechanism set forth in claim 1 in which said receiving means are spaced apart a predetermined distance less than the combined length of said spring elements and the ends of the spring elements are engageable in said receiving means simultaneously, the distance between said receiving means being sufficiently great that when one of said spring elements is completely coiled at one of said receiving means, the other spring element is disengaged from the other receiving means and is at least partially straightened and disposed between said members.

LEO B. GLASER.
FRANK A. VOTTA, Jr.

References Cited in the file of this patent

UNITED STATES PATENTS

| Number | Name | Date |
|---|---|---|
| 122,288 | Smith | Dec. 26, 1871 |
| 2,175,516 | Bugatti | Oct. 10, 1939 |
| 2,273,644 | Hope | Feb. 17, 1942 |
| 2,609,192 | Lermont | Sept. 2, 1952 |

FOREIGN PATENTS

| Number | Country | Date |
|---|---|---|
| 51,392 | Germany | Apr. 1, 1890 |

OTHER REFERENCES

"The Negative Spring—a Basic New Elastic Member" by W. J. Cook and P. C. Clarke. Product Engineering, July, 1949, pages 136–140.